United States Patent Office 3,577,232
Patented May 4, 1971

3,577,232
REMOVING NICKEL FROM CADMIUM
John A. Ruppert, Edgewood Farms, Ellicott City, Md. 21042, and Dominic Montagna, 6144 31st St. NW., Washington, D.C. 20015
No Drawing. Filed May 29, 1969, Ser. No. 829,092
Int. Cl. C22b 9/10, 17/00, 23/00
U.S. Cl. 75—71                                     10 Claims

ABSTRACT OF THE DISCLOSURE

A molten halide flux is formed on top of a metallic melt of nickel-contaminated cadmium. Phosphorus is then added to the flux, and the phosphorus ingests into the metallic melt through the flux-metal interface to react with the nickel so as to form insoluble nickel-phosphorus compounds which are then removed from the molten cadmium.

---

The invention relates to the removal of nickel from nickel-contaminated cadmium metal.

Cadmium is used in many areas including electroplating, pigments, batteries, phosphorus for TV picture tubes, fusible and brazing alloys etc. Presently this metal is mainly produced as a by-product in zinc and lead production. As relatively high cadmium content zinc and lead ores become depleted in the not-too-distant future, recovery of cadmium from scrap sources will become increasingly more urgent.

One potential scrap source is the nickel-cadmium battery. Such batteries are employed extensively by the military in radio communications, air, sea and ground transport, radar and photography. Civilian uses for this type of cell include power sources for small television sets, power tools, electric shavers, typewriters, and toothbrushes, as well as other portable electrical appliances. Considerable numbers of these batteries, when their useful life is over, will return to future recovery plants by way of the scrap market just as lead-acid batteries are now being sent back to processors for reclamation of their lead content. Any simple smelting process for reclaiming cadmium metal from scrap batteries will result in a cadmium melt contaminated with small amounts of dissolved nickel. Although there are prior art techniques for effecting a significant separation between cadmium and nickel, heretofore, so far as is known, no process has been provided for substantially completely removing dissolved nickel from molten cadmium.

We have now discovered that even trace amounts of nickel can be removed from cadmium by forming a molten halide salt flux cover on a metallic melt of nickel-contaminated cadmium, and adding phosphorus to the molten flux. In this manner the phosphorus becomes ingested into the metallic melt through the flux-molten metal interface, and reacts with the nickel to form insoluble nickel-phosphorus compounds which are subsequently separated from the purified cadmium metal. The flux is essential to the process in that the nickel-phosphorus compounds will only partially form when the phosphorus is added directly to the metallic melt.

It is therefore an object of the present invention to produce substantially pure cadmium metal. Another object is to remove nickel from cadmium. A further object is to remove trace quantities of nickel from cadmium. Other bojects and advantages will be obvious from the following more detailed description of the invention.

In the practice of the invention a molten metal halide and/or ammonium halide flux is formed on top of the molten nickel-contaminated cadmium metal. This can be accomplished by adding the flux constituents to the molten cadmium metal, in which case the salt flux melts almost immediately and rises to the top to thereby cover the metal melt. A temperature of about 325° C. to about 400° C., preferably 350° C., is employed in this step and during the subsequent nickel-phosphorus reaction. A quartz or graphite container is suitable for the operation.

Halides suitable for the purposes of the invention are the chlorides, bromides and iodides. Each metal halide constituent should have a standard free energy of formation which is represented by a larger negative number than the corresponding cadmium halide. Otherwise the halide will become reduced to its metal and a corresponding amount of replaced cadmium metal will be converted to a cadmium halide. The remaining cadmium metal will then become more contaminated than it was at the start. Acceptable metal salts include, but are not limited to, chlorides of lithium, potassium, zinc, sodium, aluminum, magnesium and calcium.

Suitable flux-to-metal ratios range from about 1:5 to about 1:20. Preferably, for every thousand parts of contaminated cadmium, about 90 to 126 parts of flux are employed.

Once the molten flux is formed on top of the metal melt, phosphorus is preferably added to the flux in an amount of about .25 to about 1.0 parts per part of nickel present in the cadmium. Red phosphorus is the preferred form because it is most readily handled. Although an inert atmosphere (e.g., argon) is helpful to prevent loss of part of the phosphorus by burning, such an atomsphere is not essential especially if an excess of phosphous is employed.

Reaction time for formation of the nickel-phosphorus compounds is best determined experimentally for each set of conditions including such variables as the amount of nickel present in the contaminated cadmium. For cadmium containing .5% nickel or less, a one hour reaction is sufficient.

After the nickel-phosphorus compounds are formed, the flux is removed, for example, by decantation or by cooling to solidification and subsequently washing away solidified flux.

Once the flux is removed, several techniques can be employed to separate the insoluble nickel-phosphorus compounds from purified cadmium. For example, while the cadmium is in a molten state, the insoluble nickel-phosphorus compounds, which eventually float to the top, can be skimmed off; or the purified cadmium can be tapped from the bottom. Filtration or centrifugation of the melt is also effective. Alternatively, the mixture can be solidified and slowly remelted to effect separation by liquation. If filtration is employed, filters such as glass cloth, quartz fibers, woven asbestos, metallic screen, porous carbon, crushed refractory or stone, etc., can be employed.

On a laboratory scale, a suitable separation device consists of an upper chamber, the bottom of which comprises a perforated plate covered by a glass fabric filter medium. A graphite-lined lower chamber or receiver capable of being evacuated is attached to the upper chamber by bolted flanges. The entire apparatus is held within an electrically-heated vertical tube furnace. In operation the ingot product from the nickel-phosphorus compound forming step is placed in the upper chamber under predetermined conditions of time and temperature for filtration. This is usually from one to three hours at 350° C. When the melt is ready to be filtered, a vacuum pump connected to the receiver is turned on and the liquid phase consisting of molten cadmium is forced through the glass cloth into the receiver. The nickel-phosphorus compound along with some entrapped cadmium remains on the cloth as a filter cake. Alternatively, the vacuum pump may be dispensed with and a quickly attachable lid fitted on the top of the filter apparatus substituted. This will allow the upper chamber to be pressurized through a suitable connection in the lid by a compressed argon tank, thus forcing the liquid phase through the filter medium.

The following examples illustrate the effectiveness of the present invention:

EXAMPLE 1

Five hundred grams of cadmium containing 0.5 percent nickel were melted under an argon atmosphere at 350° C. in a graphite crucible heated by a resistance-wound pot furnace. Temperature was regulated by a chromelalumel thermocouple and automatic controller. A mixture of 41.0 grams of KCl and 19.0 grams of LiCl was stirred into the melt using a motor-driven graphite agitator. The salt mix began to melt almost immediately and in a short time formed a liquid flux covering the surface of the melt. A quantity of 2.0 grams of red phosphorus was then added to the salt flux while stirring continued. One hour from the addition of the phosphorus, the crucible was removed from the furnace and the melt poured into a graphite mold, allowed to cool and the now solidified salt flux removed by washing. The metal ingot was then transferred to the filter and held at 350° C. for one hour. At this temperature the ingot became liquid again. At the end of this time, the upper chamber was pressurized with argon gas and the melt forced through a layer of woven glass fabric. Upon cooling the filter to room temperature and removal of both the filter cake and solidified filtrate, the filter cake was found to contain most of the nickel originally present. The filter cake weighing 44.5 grams analyzed 5.42 percent nickel. X-ray diffraction analysis indicated the presence of $Ni_2P$. The filtrate, representing the purified metal, weighed 450.0 grams and contained 0.01 percent nickel.

EXAMPLE 2

Five hundred grams of cadmium containing 0.5 percent nickel were melted under a normal air atmosphere at 350° C. in a graphite crucible. A mixture of 41.0 grams of KCl and 19.0 grams of LiCl was stirred into the melt, the salt mix fluidizing almost immediately. A quantity of 0.5 gram of red phosphorus was then added to the salt flux while stirring continued. One hour from the addition of the phosphorus, the contents of the crucible were poured into a mold, allowed to cool and the solidified salt flux removed. The metal ingot was transferred to the filter and held at 350° C. for one hour. At the end of this time the upper chamber was pressurized with argon gas and the melt forced through a layer of woven glass fabric. Upon cooling the filter and removing the contents, the filter cake weighing 34.5 grams was found to contain 5.87 percent nickel. The filtrate weighing 456.0 grams had a nickel content of 0.11 percent. This relatively large amount of nickel in the refined metal appeared to indicate that insufficient phosphorus was used in the nickel-phosphorus compound forming step.

EXAMPLE 3

Five hundred grams of cadmium containing 0.5 percent nickel were melted under a normal air atmosphere at 350° C. in a graphite crucible. A combination of 30.0 grams of $ZnCl_2$ and 30.0 grams of $NH_4Cl$ was stirred into the melt, the salt mixture becoming fluid almost immediately. A quantity of 2.0 grams of red phosphorus was stirred into the salt flux for one hour. At the end of this time the contents of the crucible were poured into a mold, allowed to cool and the salt flux removed. The metal ingot was then transferred to the filter and held at 350° C. for three hours. The upper chamber was then pressurized with argon gas and the melt forced through a layer of woven glass fabric. Upon cooling the filter and removing the contents, the filter cake weighed 39.8 grams and contained 5.24 percent nickel. The filtrate weighting 433.0 grams contained 0.04 percent nickel.

EXAMPLE 4

A quantity of 500.0 grams of cadmium containing 0.5 percent nickel was melted at 350° C. under an argon atmosphere in a quartz crucible. A mixture of 35.0 grams of $ZnCl_2$, 15.0 grams of KCl and 10.0 grams of NaCl was stirred into the molten metal, the salts melting almost immediately. A quantity of 2.0 grams of red phosphorus was stirred into the salt flux for one hour. The contents of the crucible were then poured into a mold, cooled and the salt flux removed. The metal ingot was transferred to the filter and held at 350° C. for two hours. Filtration was performed through woven glass fabric with the aid of the vacuum pump. Upon cooling the filter and removing the contents, the filter cake was found to weigh 46.5 grams and analyzed 5.30 percent nickel. The filtrate, weighing 450.0 grams, contained 0.01 percent nickel.

EXAMPLE 5

A quantity of 438.0 grams of cadmium containing 0.5 percent nickel was melted at 350° C. under an atmosphere of argon in a graphite crucible. A mixture of 30.0 grams of $ZnCl_2$, 10.0 grams of KCl and 15.0 grams of NaCl was stirred into the molten metal, the combination of salts melting almost immediately. A quantity of 2.0 grams of red phosphorus was stirred into the salt flux for one hour. At the end of this time the contents of the crucible were poured into a mold, cooled and the salt flux removed. The metal ingot was placed in the filter and held at 350° C. for one hour. The lower chamber was then connected to the vacuum pump and filtration performed by suction. In this test an improved filter medium was used. This consisted of two layers of woven glass fabric with a layer of quartz wool fibers held between them in sandwich fashion. Upon cooling the filter and removing the contents, two separate filter cakes were found. One was resting on top of the upper glass fabric layer and the other was found between the upper and lower glass fabric layers within the interstices between the quartz fibers. Upon analysis, the upper filter cake weighing 27.3 grams contained 9.04 percent nickel. The filter cake found in between the quartz fibers weighed 13.4 grams and contained 0.18 percent nickel. The filtrate weighed 395.0 grams and contained less than 0.001 percent nickel.

EXAMPLE 6

A quantity of 438.0 grams of cadmium containing 0.5 percent nickel was melted at 350° C. under an atmosphere of argon in a graphite crucible. A mixture of 20.0 grams of $ZnCl_2$, 15.0 grams of KCl and 10.0 grams of NaCl was stirred into the molten metal, the combination of salts melting almost immediately. A quantity of 2.0 grams of red phosphorus was stirred into the salt flux for one hour. At the end of this time, the contents of the crucible were poured into a mold, allowed to cool and the salt flux removed. The metal ingot was transferred to the filter, held for one hour at 350° C. and then filtered through the glass fabric-quartz wool fiber sandwich filter medium with the aid of the vacuum pump. Upon cooling the filter and removing the contents, upper and lower filter cakes were recovered as in Example 5. Upon analysis the upper filter cake weighing 22.4 grams contained 10.6 percent nickel. The lower filter cake weighed 9.1 grams and contained 0.03 percent nickel. The filtrate weighed 400.0 grams and contained less than 0.001 percent nickel.

EXAMPLE 7

A quantity of 438.0 grams of cadmium containing 0.5 percent nickel was melted at 350° C. under an atmosphere of argon in a graphite crucible. A mixture of 25.0 grams of $ZnCl_2$, 15.0 grams of KCl and 10.0 grams of NaCl was stirred into the metal, the salts melting almost immediately. An amount of 2.0 grams of red phosphorus was stirred into the salt flux for one hour. The contents of the crucible were then poured into a mold, allowed to cool and the salt flux removed. The metal ingot was transferred to the filter, held for one hour at 350° C. and then vacuum filtered through the glass fabric-quartz wool fiber sandwich filter medium. Upper and lower filter cakes were found upon cooling as in Example 5. The upper cake weighing 23.4 grams contained 11.3 percent nickel. The lower cake weighed 8.1 grams and contained 0.06 percent nickel. The filtrate was found to weigh 398.0 grams and contained less than 0.001 percent nickel.

As can be seen from the examples, purified cadmium containing as little as .001% nickel is produced by the process of the present invention.

What is claimed is:

1. A process for purifying nickel-contaminated cadmium metal comprising:
    (a) forming a molten halide salt flux on top of molten nickel-contaminated cadmium metal;
    (b) adding phosphorus to said molten flux so that said phosphorus passes through the flux-metal interface to react with said nickel so as to form insoluble nickel-phosphorus compounds within a molten body of purified cadmium; and
    (c) separating said compounds from said purified cadmium.

2. The process of claim 1 wherein said halide salt is selected from the group consisting of ammonium halide, metal halides, and mixtures thereof, each of said metal halides having a standard free energy of formation represented by a larger negative number than that of the corresponding cadmium halide.

3. The process of claim 2 wherein said halide is a chloride and said metal halide is selected from the group consisting of chlorides of lithium, potassium, sodium, calcium, magnesium, zinc and aluminum.

4. The process of claim 1 wherein the temperature during formation of said nickel-phosphorus compounds is about 350° C., and wherein said phosphorus is red phosphorus.

5. The process of claim 2 wherein the temperature during formation of said nickel-phosphorus compounds is about 350° C., and wherein said phosphorus is red phosphorus.

6. The process of claim 1 wherein said insolubule nickel-phosphorus compounds are separated from said purified cadmium by filtration.

7. The process of claim 2 wherein said insoluble nickel-phosphorus compounds are separated from said purified cadmium by filtration.

8. The process of claim 4 wherein said insoluble nickel-phosphorus compounds are separated from said purified cadmium by filtration.

9. The process of claim 1 wherein said flux is separated from purified cadmium metal prior to removing said nickel-phosphorus compounds from said purified metal.

10. The process of claim 8 wherein said flux is separated from purified cadmium metal prior to removing said nickel-phosphorus compounds from said purified metal.

References Cited

UNITED STATES PATENTS

| 3,010,821 | 11/1961 | Platt et al. | 75—94 |
| 1,814,023 | 7/1931 | Girsewald et al. | 75—71 |
| 2,178,763 | 11/1939 | O'Brien | 75—71 |
| 3,291,597 | 12/1966 | Mellgreu et al. | 75—71 |

FOREIGN PATENTS

| 788,493 | 10/1935 | France | 75—94 |

DELBERT E. GANTZ, Primary Examiner

V. O'KEEFE, Assistant Examiner

U.S. Cl. X.R.

75—94

UNITED STATES PATENT OFFICE
CERTIFICATE OF CORRECTION

Patent No. 3,577,232                    Dated     May 4, 1971

Inventor(s)  John A. Ruppert et al.

It is certified that error appears in the above-identified patent and that said Letters Patent are hereby corrected as shown below:

In the heading to the printed specification, lines 3 to 5, "John A. Ruppert, Edgewood Farms, Ellicott City, Md. 21042, and Dominic Montagna, 6144 31st St., N. W., Washington, D. C. 20015" should read -- John A. Ruppert, 6144 31st St., N. W., Washington, D. C. 20015 and Dominic Montagna, Edgewood Farms, Ellicott City, Md. 21042 --. Column 1, line 23, "phosphorus" should read -- phosphors --; line 65, "bojects" should read -- objects --.

Signed and sealed this 30th day of November 1971.

(SEAL)
Attest:

EDWARD M. FLETCHER, JR.                ROBERT GOTTSCHALK
Attesting Officer                      Acting Commissioner of Patents